(12) United States Patent
Takeuchi (10) Patent No.: US 7,355,636 B2
(45) Date of Patent: Apr. 8, 2008

(54) IMAGE PROCESSING APPARATUS ENABLED TO GENERATE IMAGE PROCESSING INFORMATION USABLE BY OTHER IMAGE PROCESSING DEVICES

(75) Inventor: Yoshitaka Takeuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 763 days.

(21) Appl. No.: 10/280,760

(22) Filed: Oct. 25, 2002

(65) Prior Publication Data

US 2003/0112342 A1 Jun. 19, 2003

(30) Foreign Application Priority Data

Oct. 26, 2001 (JP) .............................. 2001-329640

(51) Int. Cl.
*H04N 9/73* (2006.01)
*H04N 5/76* (2006.01)

(52) U.S. Cl. ................................. 348/223.1; 348/231.6

(58) Field of Classification Search ............ 348/223.1, 348/222.1, 231.6; 358/516
See application file for complete search history.

(56) References Cited

U.S. PATENT DOCUMENTS

| | | | | |
|---|---|---|---|---|
| 4,524,381 A | | 6/1985 | Konishi | 358/29 |
| 4,574,319 A | | 3/1986 | Konishi | |
| 4,626,893 A | * | 12/1986 | Yamanaka | 348/176 |
| 5,260,774 A | * | 11/1993 | Takayama | 348/655 |
| 6,724,423 B1 | * | 4/2004 | Sudo | 348/188 |
| 6,982,753 B1 | * | 1/2006 | Udagawa | 348/223.1 |
| 7,009,640 B1 | * | 3/2006 | Ishii et al. | 348/223.1 |
| 7,133,071 B2 | * | 11/2006 | Takeuchi | 348/223.1 |
| 2002/0054220 A1 | * | 5/2002 | Takeuchi | 348/223 |
| 2002/0130959 A1 | * | 9/2002 | McGarvey | 348/223 |

FOREIGN PATENT DOCUMENTS

| | | |
|---|---|---|
| JP | 57-185777 | 11/1982 |
| JP | 4-8993 | 2/1992 |
| JP | 5145931 | 6/1993 |
| JP | 6098348 | 4/1994 |
| JP | 6197371 | 7/1994 |
| JP | 7212706 | 8/1995 |
| JP | 7231418 | 8/1995 |
| JP | 10285541 | 10/1998 |
| JP | 2000-165891 | * 6/2000 |
| JP | 2001218077 | 8/2001 |

OTHER PUBLICATIONS

JP Office Action dated Dec. 12, 2006 (issued in JP Pat. Appln. No. 2001-329640).

* cited by examiner

*Primary Examiner*—Lin Ye
*Assistant Examiner*—Nicholas G Giles
(74) *Attorney, Agent, or Firm*—Morgan & Finnegan, LLP (57) ABSTRACT

An object of this invention is to provide an image processing system capable of providing a high-quality pickup image by an arrangement in which white balance control to a pickup image can always be efficiently, properly performed. To achieve this object, a pickup image storing side multi-stores, in a memory removable from an apparatus or system together with an image picked up by an image pickup device having a plurality of color filters, a plurality of control values (values obtained by a generating device) used for white balance control of the pickup image. A pickup image reproducing side reads out the pickup image and the control values from the memory, and performs white balance control to the pickup image on the basis of an arbitrary control value selected from these control values.

10 Claims, 6 Drawing Sheets

IMAGE PROCESSING APPARATUS ENABLED TO GENERATE IMAGE PROCESSING INFORMATION USABLE BY OTHER IMAGE PROCESSING DEVICES

FIELD OF THE INVENTION

The present invention relates to an image processing apparatus, image processing system, and image processing method used in an apparatus or system having an image storing function and reproducing function, such as a digital camera which performs white balance processing to an image picked up by an image pickup means having a plurality of color filters, a computer-readable storage medium which stores a program for executing the image processing method, and the program.

BACKGROUND OF THE INVENTION

Recently, digital cameras as one of image input means to a personal computer have played an important role along with the spread of personal computers (to be simply referred to as "PCs" hereinafter) to the consumer market.

In a film camera, the white balance of a photographed image is adjusted by mounting a filter on a lens by the user (photographer) in accordance with the color temperature of a light source for irradiating an object to be photographed. In a digital camera, white balance processing (calculation processing) is executed to pickup image data output from an image pickup element having a color filter, which reduces the burden on the user.

White balance processing in the digital camera includes the following auto white balance processing and preset white balance processing.

(Auto White Balance Processing)

A white (achromatic) portion of pickup image data output from an image pickup element is detected. The color temperature of an irradiation light source with respect to the object in the pickup image is obtained from the detection result (white portion). The pickup image data output from the image pickup element is multiplied by a white balance control value (control value for changing the object region of the white portion into an achromatic color) based on the color temperature.

(Preset White Balance Processing)

Multiplication processing (white balance calculation processing) is performed to pickup image data output from the image pickup element so as to change image data of the object region into an achromatic color.

Preset white balance processing has a sunlight white balance mode in which a white balance control value corresponding to the color temperature of sunlight is selected when an object irradiated with sunlight as a light source is to be picked up, and a tungsten white balance mode in which a white balance control value corresponding to the color temperature of light from a tungsten electric light bulb is selected when an object irradiated by light from the tungsten electric light bulb as a light source is to be picked up.

Figure 4A:
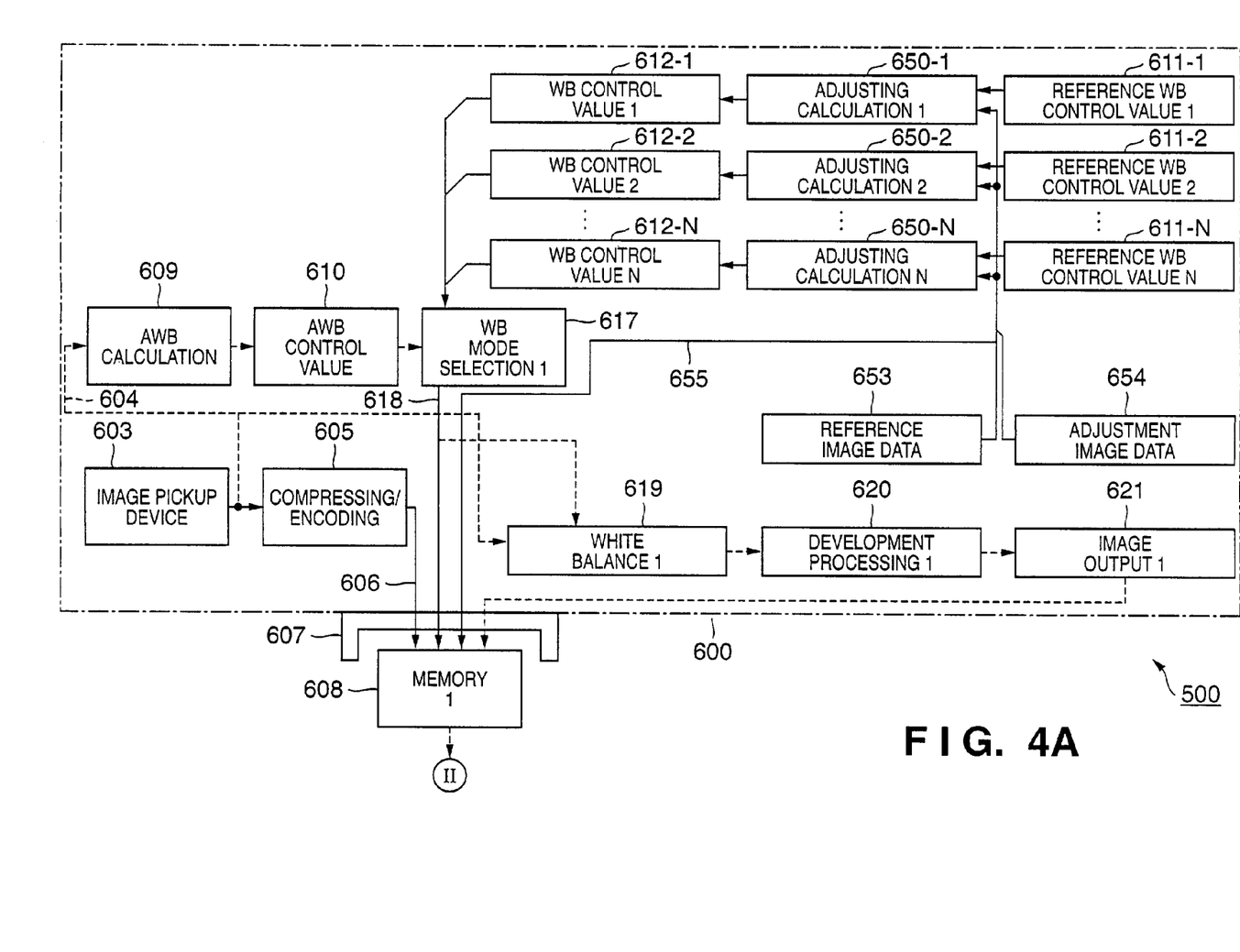
FIGS. 4A and 4B are block diagrams showing the arrangement of a conventional image processing system.
Figure 4B:
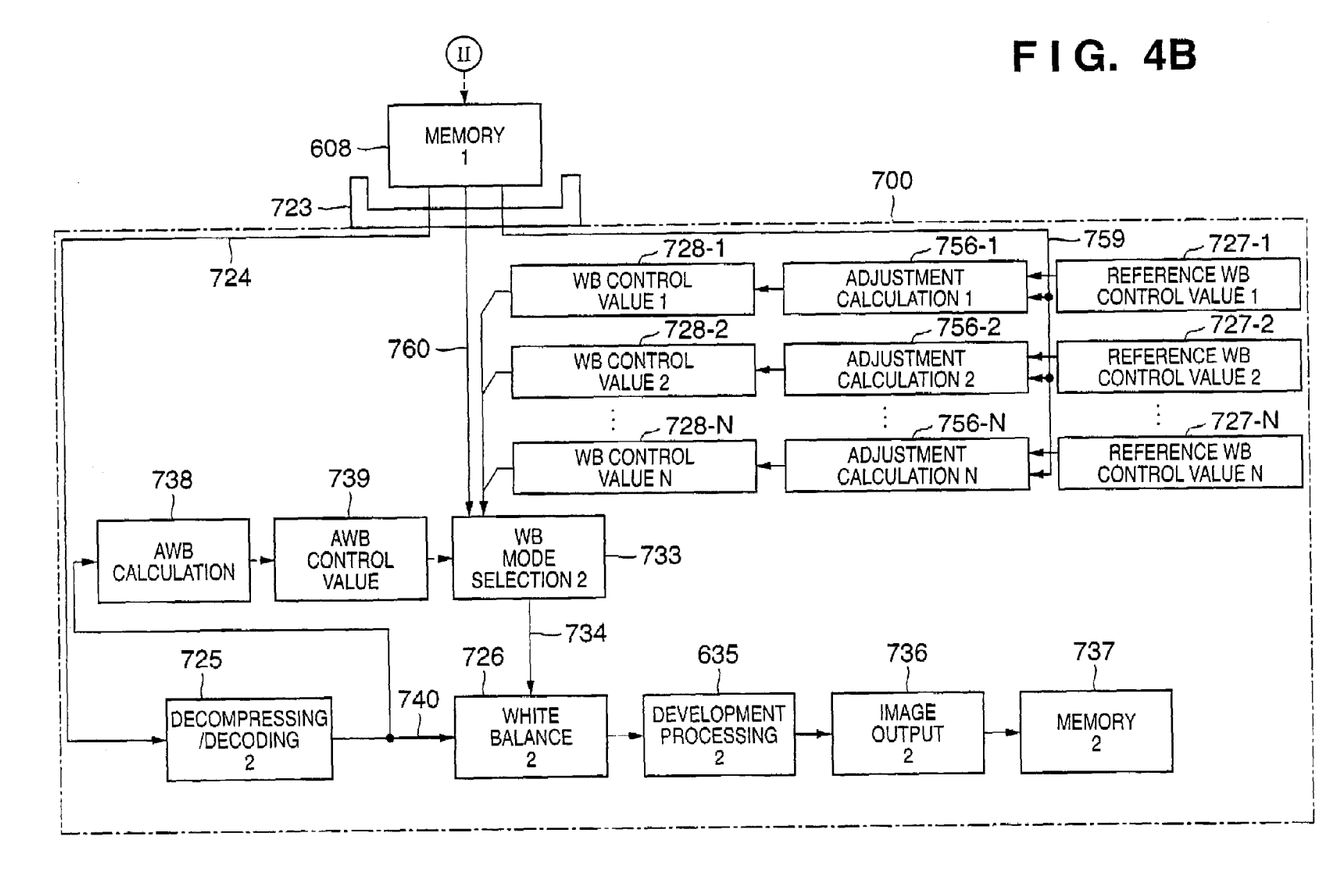

FIGS. 4A and 4B show the arrangement of an image processing system 500 having the function of the above-described white balance processing.

As shown in FIGS. 4A and 4B, the image processing system 500 comprises a digital camera 600 and image reproducing apparatus 700.

The digital camera 600 has a function of storing image data from an image pickup device 603 to a memory 608.

The image reproducing apparatus 700 is a personal computer, development processing-dedicated apparatus, or the like. The image reproducing apparatus 700 has a function of reading out image data stored in the memory 608, performing development processing including white balance processing to the image data, and storing the processed image in a built-in memory 737.

A series of operations of the image processing system 500 will be explained.

In the digital camera 600, the image pickup device 603 outputs image data (data output from a color filter) 604 picked up by an image pickup element (not shown) having a color filter.

The pickup image data 604 output from the image pickup device 603 is stored in the memory 608 on the basis of the operation mode of the digital camera 600 as follows.

For example, when the operation mode of the digital camera 600 is a RAW mode, a lossless compressing/encoding processing device 605 losslessly compresses and encodes the pickup image data 604 which is output from the image pickup device 603 and does not undergo any processing. The losslessly compressed/encoded image data is directly stored in the memory 608.

When the operation mode of the digital camera 600 is a JPEG mode, a white balance control device 619 executes calculation processing for white balance control to the pickup image data 604 which is output from the image pickup device 603 and does not undergo any processing.

A development processing device 620 performs development processing such as color matrix transformation to the image data processed by the white balance control device 619. The development processing device 620 further performs lossy compression/encoding processing to generate JPEG image data.

An image output device 621 stores the JPEG image data obtained by the development processing device 620 in the memory 608.

The operation in the JPEG mode will be explained in detail. The white balance control device 619 executes calculation processing for the above-mentioned white balance control based on a white balance control value 618. The white balance control value 618 is generated as follows.

An auto white balance (AWB) calculating device 609 calculates an AWB control value 610 by performing white determination processing to each color component data (data output from a color filter) which constitutes the pickup image data 604 output from the image pickup device 603. The AWB calculating device 609 outputs the AWB control value 610 to a WB mode selecting device 616.

The WB mode selecting device 616 receives WB control values 612(1) to 612(N) together with the AWB control value 610 (N: integer of N≧2).

The WB control values 612(1) to 612(N) are white balance control values corresponding to the color temperatures of light sources which irradiate various objects to be picked up. The WB control values 612(1) to 612(N) are calculated by adjustment calculating devices 650(1) to 650(N).

More specifically, the adjustment calculating devices 650(1) to 650(N) calculate the WB control values 612(1) to 612(N) by executing calculation processing which absorbs the color filter characteristics of the image pickup elements of the following two digital cameras on the basis of reference WB control values 611(1) to 611(N) obtained from the results of picking up an object light source by a reference digital camera, reference image data 653 obtained by picking up a light source having an arbitrary fixed color temperature by the reference digital camera, and adjustment image data 654 obtained by picking up this light source by the digital camera 600. For example, the adjustment calculating device 650(x) calculates the WB control value 612(x) adjusted for the digital camera by executing calculation processing of setting a correction function derived using the reference WB control value 611(x) from the difference between the reference image data 653 and the adjustment image data 654 as a function of correcting the characteristics of the reference digital camera and digital camera 600.

The WB control values 612(1) to 612(N) calculated by the adjustment calculating devices 650(1) to 650(N) in this way are supplied to the WB mode selecting device 616 together with the AWB control value 610.

The reference image data 653 and adjustment image data 654 are stored in the memory 608 so as to allow the image reproducing apparatus 700 to use them.

The WB mode selecting device 616 outputs a control value 618 selected from the AWB control value 610 and the WB control values 612(1) to 612(N).

For example, when the digital camera 600 is set to the auto white balance mode, the WB mode selecting device 616 outputs the AWB control value 610 to the white balance control device 619.

The white balance control device 619 executes white balance control processing of the pickup image data 604 by multiplying, based on the control value 618 from the white balance control device 619, a gain and each color component data which constitutes the pickup image data 604 output from the image pickup device 603.

The development processing device 620 performs development processing (development processing of a luminance signal Y and color difference signal Pr/Pb) such as color matrix transformation to the image data processed by the white balance control device 619. Further, the development processing device 620 executes lossy compression/encoding processing to generate JPEG image data. The image output device 621 stores the JPEG image data in the memory 608.

The memory 608 is a removable memory which is inserted into a socket 607 of the digital camera 600. By inserting the memory 608 into a socket 723 of the image reproducing apparatus 700, data stored in the memory 608 is loaded into the image reproducing apparatus 700.

The image reproducing apparatus 700 reproduces the stored data (image data) loaded from the memory 608 as follows.

For example, to reproduce image data stored in the memory 608 in the RAW mode, a decompressing/decoding device 725 decodes image data 724 read out from the memory 608 to generate uncompressed original image data 740 of each color component output from the image pickup device 603 of the digital camera 600.

A white balance control device 726 performs calculation processing for white balance control on the basis of a white balance control value 734 to the image data 740 obtained by the decompressing/decoding device 725, similar to the white balance control device 619 of the digital camera 600.

More specifically, adjustment calculating devices 756(1) to 756(N) calculate WB control values 728(1) to 728(N) on the basis of reference WB control values 727(1) to 727(N), similar to the reference WB control values 611(1) to 611(N) in the digital camera 600, and reference image data and adjustment image data 759 stored in the memory 608 (the reference image data 653 and adjustment image data 654 used in the digital camera 600).

An auto white balance (AWB) calculating device 738 calculates an AWB control value 739 by performing white determination processing to each color component data (data output from a color filter) which constitutes the image data 740 obtained by the decompressing/decoding device 725.

A WB mode selecting device 733 outputs a control value 734 selected from the WB control values 728(1) to 728(N) calculated by the adjustment calculating devices 756(1) to 756(N) and the AWB control value 739 calculated by the AWB calculating device 738.

For example, when the image reproducing apparatus 700 is set to the auto white balance mode, the WB mode selecting device 733 outputs the AWB control value 739 as the control value 734.

The white balance control device 726 executes calculation processing for white balance control to the image data 740 from the decompressing/decoding device 725 on the basis of the control value 734 output from the WB mode selecting device 733.

A development processing device 635 performs development processing such as color matrix transformation to the image data processed by the white balance control device 726, similar to the development processing device 620 of the digital camera 600. In addition, the development processing device 635 executes lossy compression/encoding processing to generate JPEG image data. An image output device 736 stores the JPEG image data in the memory 737.

The conventional image processing system 500 shown in FIGS. 4A and 4B suffers the following problems.

For example, the image reproducing apparatus 700 must hold the same reference WB control values 727(1) to 727(N) as the reference WB control values 611(1) to 611(N) of the digital camera 600 in order to perform white balance control to image data stored in the memory 608 in the RAW mode by the digital camera 600, to perform development processing, to JPEG-encode the image data, and to store the JPEG image data. Calculation processing of calculating the control value 734 for white balance control by using the reference WB control values 727(1) to 727(N) and the reference image data 653 and adjustment image data 654 stored in the memory 608 by the digital camera 600 increases the calculation burden on the image reproducing apparatus 700, prolonging the calculation time.

Also, calculation processing of calculating the control value 739 for auto white balance control when the image reproducing apparatus 700 is set to the auto white balance mode increases the calculation burden on the image reproducing apparatus 700, prolonging the calculation time.

If, for example, the number of corresponding color temperatures and the number of reference WB control values are increased in white balance control in the digital camera 600, the number of reference WB control values must also be increased in the image reproducing apparatus 700 in order to cope with the change in the digital camera 600. This makes maintenance of the image reproducing apparatus 700 very difficult.

SUMMARY OF THE INVENTION

The present invention has been made to overcome the conventional drawbacks, and has as its an object to provide an image processing apparatus, image processing system, and image processing method capable of providing a high-quality pickup image by an arrangement in which white balance control to a pickup image can always be efficiently, properly performed, a computer-readable storage medium which stores a program for executing the image processing method, and the program.

To solve the above problems and achieve the above object, an image processing apparatus according to the present invention has the following arrangement.

That is, there is provided an image processing apparatus which reproduces a pickup image stored in a removable memory, comprising a control device which performs white balance control to the pickup image on the basis of a plurality of pieces of control information added to the pickup image by selecting arbitrary control information from the plurality of pieces of control information.

An image pickup apparatus according to the first aspect of the present invention has the following arrangement.

That is, there is provided an image pickup apparatus which stores an image picked up by an image pickup device in a removable memory, comprising a device which generates a plurality of pieces of control information about white balance control to the image, and a storing device which stores in the removable memory the image and the plurality of pieces of control information which are generated by the device in correspondence with the image.

An image processing method according to the first aspect of the present invention has the following steps.

That is, there is provided an image processing method of storing a pickup image in a removable memory, comprising the generation step of generating a plurality of pieces of control information about white balance control to the pickup image, and the storing step of storing in the memory removable from an apparatus or a system the pickup image and the plurality of pieces of control information obtained in the generation step.

An image processing method according to the second aspect of the present invention has the following steps.

That is, there is provided an image processing method of reading out a pickup image from a memory removable from an apparatus or a system and reproducing the pickup image, comprising the control step of selecting arbitrary control information on the basis of a plurality of pieces of control information added to the pickup image, and performing white balance control to the pickup image.

A storage medium according to the first aspect of the present invention stores the following program.

That is, a storage medium computer-readably stores a program for causing a computer to execute the processing steps of the above-described image processing method.

A program according to the present invention executes the following step.

That is, a program causes a computer to execute the processing step of the above-described image processing method.

An image pickup apparatus according to the second aspect of the present invention has the following arrangement.

That is, there is provided an image pickup apparatus which stores an image picked up by an image pickup device in a removable memory, comprising a built-in memory which stores a white balance control value, a correcting device adapted to correct the white balance control value on the basis of an image picked up by the image pickup apparatus with a light source having a predetermined color temperature and an image picked up by a reference image pickup apparatus with a light source having the same color temperature as the predetermined color temperature, and a storing device adapted to store in the removable memory the corrected white balance control value together with the image picked up by the image pickup device.

An image reproducing apparatus according to the present invention has the following arrangement.

That is, there is provided an image reproducing apparatus which reproduces an image stored in a removable memory, comprising a reading device adapted to read out a white balance control value corrected on the basis of the image stored in the removable memory, an image picked up by an image pickup apparatus with a light source having a predetermined color temperature, and an image picked up by a reference image pickup apparatus with a light source having the same color temperature as the predetermined color temperature, and a reproducing device adapted to reproduce a readout image on the basis of the corrected white balance control value read out by the reading device.

An image processing method according to the third aspect of the present invention has the following steps.

That is, there is provided an image processing method of storing an image picked up by an image pickup device in a removable memory, comprising correcting a white balance control value stored in a built-in memory, on the basis of an image picked up by an image pickup apparatus with a light source having a predetermined color temperature and an image picked up by a reference image pickup apparatus with a light source having the same color temperature as the predetermined color temperature, and storing in the removable memory the corrected white balance control value together with the image picked up by the image pickup device.

An image reproducing method according to the present invention has the following steps.

That is, there is provided an image reproducing method of reproducing an image stored in a removable memory, comprising the steps of reading out a white balance control value corrected on the basis of the image stored in the removable memory, an image picked up by an image pickup apparatus with a light source having a predetermined color temperature, and an image picked up by a reference image pickup apparatus with a light source having the same color temperature as the predetermined color temperature, and reproducing a readout image on the basis of the corrected white balance control value read out from the removable memory.

A storage medium according to the second aspect of the present invention stores the following program.

That is, there is provided a storage medium which stores an image processing program of storing an image picked up by an image pickup device in a removable memory, storing an operation processing program of adapting a correcting device to correct a white balance control value stored in a built-in memory on the basis of an image picked up by an image pickup apparatus with a light source having a predetermined color temperature and an image picked up by a reference image pickup apparatus with a light source having the same color temperature as the predetermined color temperature, and storing in the removable memory the corrected white balance control value together with the image picked up by the image pickup device.

A storage medium according to the third aspect of the present invention stores the following program.

That is, there is provided a storage medium which stores an image reproducing program of reproducing an image stored in a removable memory, storing an operation processing program of reading out a white balance control value corrected on the basis of the image stored in the removable memory, an image picked up by an image pickup apparatus with a light source having a predetermined color temperature, and an image picked up by a reference image pickup apparatus with a light source having the same color temperature as the predetermined color temperature, and reproducing a readout image on the basis of the corrected white balance control value read out from the removable memory.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

A preferred embodiment of the present invention will be described below with reference to the accompanying drawings.

Figure 1:
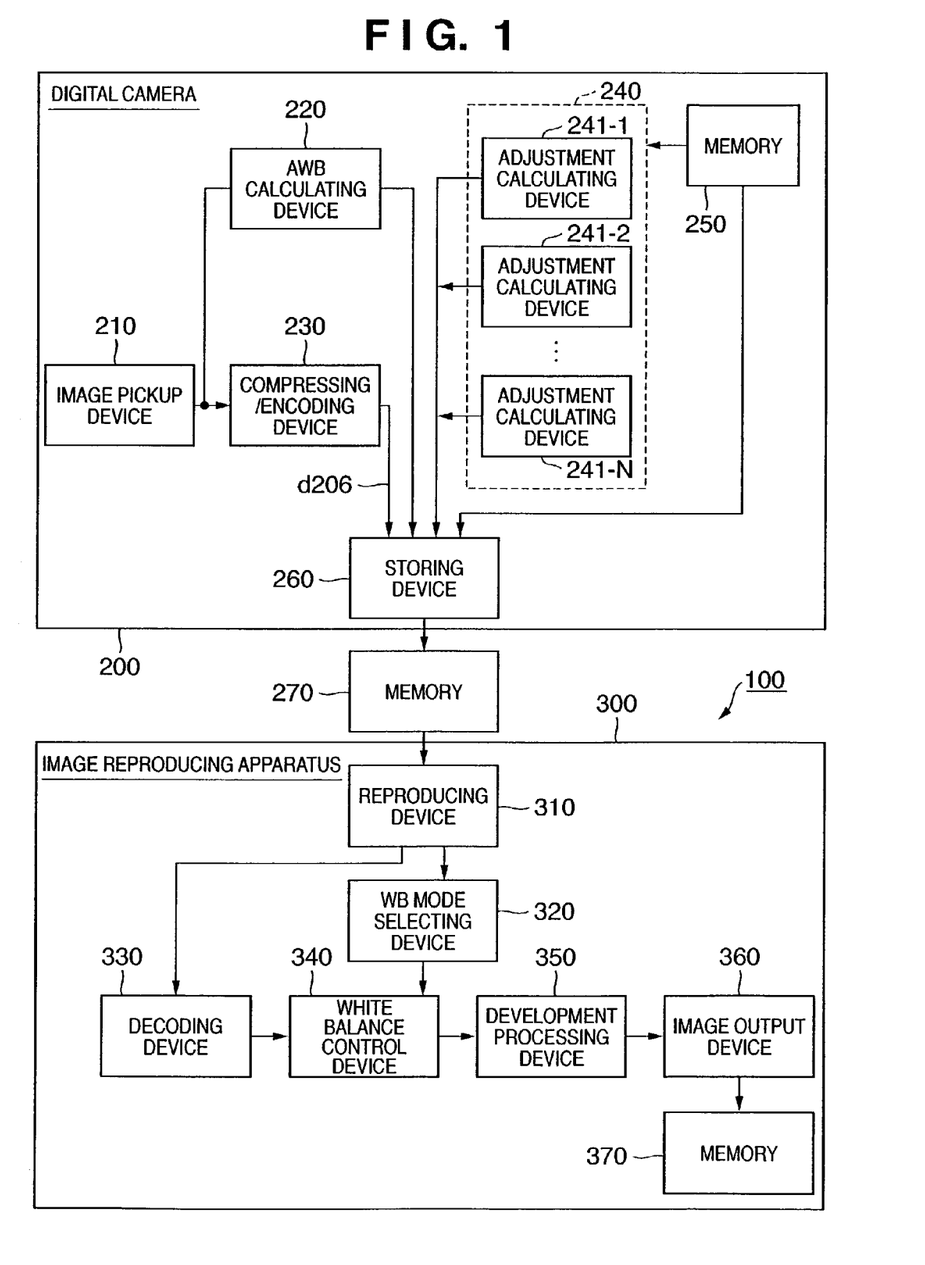
FIG. 1 is a block diagram showing the arrangement of an image processing system to which the present invention is applied.

The present invention is applied to, e.g., an image processing system 100 as shown in FIG. 1. As shown in FIG. 1, the image processing system 100 comprises a digital camera 200 and image reproducing apparatus 300.

The digital camera 200 comprises an image pickup device (photographing device) 210 which acquires image data picked up by an image pickup element having a plurality of color filters, a compressing/encoding device 230 which performs non-compression processing or lossless compression processing to the pickup image data (digital data), and a storing device 260 which stores the image data processed by the compressing/encoding device 230 in a memory 270 removable from the digital camera 200.

The image reproducing apparatus 300 comprises a reproducing device 310 which reads out data stored in the memory 270, a decoding device 330 which decodes image data (compressed data) contained in the readout data, a white balance control device 340 which performs white balance control processing to the image data decoded by the decoding device 330, a development processing device 350 which performs visualization processing using a color matrix to the image data processed by the white balance control device 340, and an image output device 360 which stores the image data processed by the development processing device 350 in a memory 370.

According to this embodiment, the digital camera 200 especially comprises, in-addition to the above arrangement, a calculating group 240 having a plurality of adjustment calculating devices 241(1) to 241(N) which calculate a plurality of control values (control values for color components corresponding to color temperatures) used for white balance control processing in the image reproducing apparatus 300, a memory 250 which stores various data and the like used in the calculating group 240, and an AWB calculating device 220 which calculates a control value used in auto white balance (AWB) control processing in the image reproducing apparatus 300.

The storing device 260 multi-stores, in the memory 270 together with the above-described processed image data, a control value calculated by the AWB calculating device 220, a plurality of control values obtained by adjusting and calculating a plurality of reference preset white balance control values in the memory 250 by the adjustment calculating devices 241(1) to 241(N), and corresponding data in the memory 250.

In addition to the above arrangement, the image reproducing apparatus 300 comprise a WB mode selecting device 320 which selects an arbitrary one of a plurality of control values read out from the memory 270 by the reproducing device 310, and outputs the selected control value.

The white balance control device 340 performs white balance control processing to image data processed by the decoding device 330 on the basis of a control value output from the WB mode selecting device 320.

The operation of the image processing system 100 will be explained in detail.

Figure 2A:
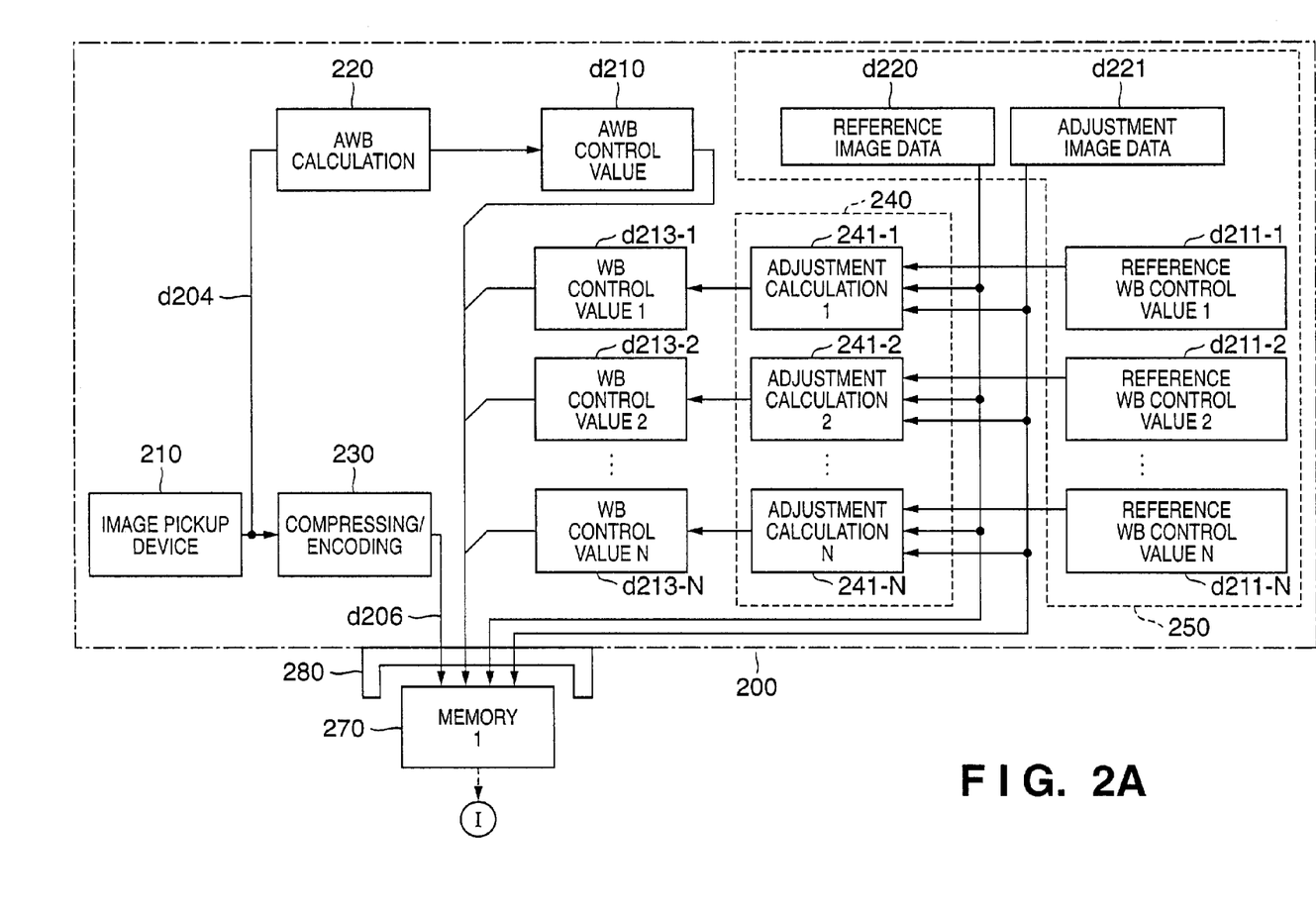
FIGS. 2A and 2B are block diagrams showing the detailed arrangement of the image processing system.
Figure 2B:
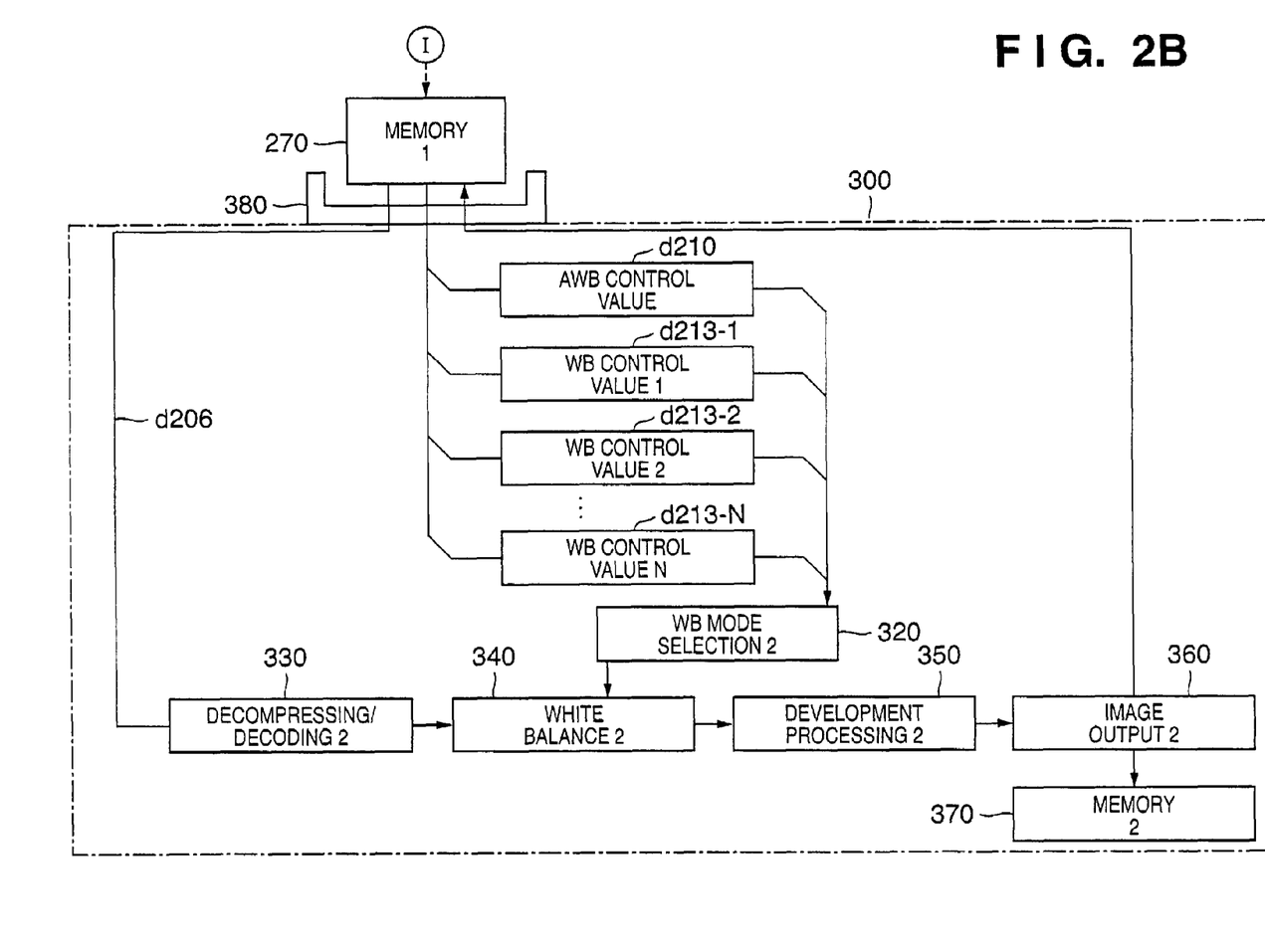

FIGS. 2A and 2B show an arrangement when attention is given to a data flow in the image processing system 100 of FIG. 1.

In the digital camera 200, the image pickup device 210 outputs image data (data output from a color filter) d204 picked up by an image pickup element (not shown) having a color filter.

The lossless compressing/encoding device 230 losslessly compresses and encodes the pickup image data d204 output from the image pickup device 210. The lossless compressing/encoding device 230 stores encoded image data d206 in the memory 270 via the storing device 260 (see FIG. 1).

The auto white balance (AWB) calculating device 220 calculates an AWB control value d210 by performing white determination processing (processing of determining a white color by detecting the color temperature of a light source in a pickup image) to each color component data (data output from a color filter) which constitutes the pickup image data d204 output from the image pickup device 210. The AWB calculating device 220 stores the AWB control value d210 in the memory 270 via the storing device 260 (see FIG. 1).

The adjustment calculating devices 241(1) to 241(N) calculate WB control values d213(1) to d213(N) by executing calculation processing which absorbs the color filter characteristics of the image pickup elements of the following two digital cameras on the basis of reference WB control values d211(1) to d211(N) as preset white balance control values obtained from the results of picking up an achromatic object by a reference digital camera (other than the digital camera 200) with light sources having different color temperatures, reference image data d220 obtained by picking up a light source having an arbitrarily set, fixed color temperature by the reference digital camera, and adjustment image data d221 obtained by picking up the arbitrarily set, fixed light source by the digital camera 200.

The reference WB control values d211(1) to d211(N), reference image data d220, and adjustment image data d221 are stored in the memory 250.

For example, the adjustment calculating device 241(x) calculates the WB control value d213(x) adjusted for the digital camera by executing calculation processing of setting a correction function derived using the reference WB control value d211(x) from the difference between the reference image data d220 and the adjustment image data d221 as a function of correcting the characteristics of the reference digital camera and digital camera 200.

In this manner, the adjustment calculating devices 241(1) to 241(N) calculate the WB control values d213(1) to d213(N) serving as white balance control values corresponding to the color temperatures of various light sources which irradiate an object to be picked up.

The WB control values d213(1) to d213(N) are stored in the memory 270 via the storing device 260 (see FIG. 1) together with the reference image data d220 and adjustment image data d221.

More specifically, in this embodiment, the AWB control value d210 and the WB control values (preset white balance control values) d213(1) to d213(N) for image data d204 (d206) of one frame obtained by the image pickup device 210 are stored in the memory 270 as additional information for the image data d204 (d206).

The memory 270 is a removable memory which is inserted into a socket 280 of the digital camera 200. By inserting the memory 270 into a socket 380 of the image reproducing apparatus 300, data stored in the memory 270 is loaded into the image reproducing apparatus 300.

The image reproducing apparatus 300 reproduces the stored data (image data) loaded from the memory 270 as follows.

In the image reproducing apparatus 300, the reproducing device 310 (see FIG. 1) reads out, from the memory 270 together with the image data d206, the AWB control value d210 and the WB control values d213(l) to d213(N) which are associated with the image data d206.

The decoding device 330 decodes the image data d206 (compressed data) obtained by the reproducing device 310, thereby generating uncompressed original image data d204 of each color component output from the image pickup device 210 of the digital camera 200.

At this time, the user of the image reproducing apparatus 300 selects an arbitrary white balance control value regardless of a white balance mode selected in the digital camera 200.

Based on the user's selection, the WB mode selecting device 320 outputs a corresponding one of the AWB control value d210 and the WB control values d213(1) to d213(N) obtained by the reproducing device 310.

The white balance control device 340 performs calculation processing for white balance control (processing of, e.g., multiplying image data by a white balance gain value for each color component) to the image data obtained by the decompressing/decoding device 330 on the basis of the control value output from the WB mode selecting device 320.

The development processing device 350 performs development processing such as color matrix transformation to the image data processed by the white balance control device 340. The development processing device 350 further performs lossy compression/encoding processing to generate JPEG image data.

The image output device 360 stores the JPEG image data obtained by the development processing device 350 in the memory 370. If necessary, the image output device 360 stores the JPEG image data obtained by the development processing device 350 in the memory 270.

As described above, in this embodiment, the digital camera 200 stores a control value for white balance control to pickup image data, as additional information in the memory 270 together with the pickup image data. In the image reproducing apparatus 300 which reproduces the pickup image data, the user can freely select a control value for desired white balance control regardless of white balance control in the digital camera 200. A white balance control result based on the selected control value can be obtained. The image reproducing apparatus 300 need not be equipped with any arrangement of obtaining a control value for white balance control. The calculation burden on the image reproducing apparatus 300 can be reduced.

This embodiment more greatly reduces the burden of calculation processing for white balance control particularly when a terminal apparatus such as a personal computer is used as the image reproducing apparatus 300.

The object of the present invention is also achieved when a storage medium which stores software program codes for realizing the functions of the host and terminal of the embodiment is supplied to a system or apparatus, and the computer (or the CPU or MPU) of the system or apparatus reads out and executes the program codes stored in the storage medium.

In this case, the program codes read out from the storage medium realize the functions of the embodiments. The storage medium which stores the program codes, and the program codes constitute the present invention.

The storage medium for supplying the program codes includes a ROM, flexible disk, hard disk, optical disk, magnetooptical disk, CD-ROM, CD-R, magnetic tape, and nonvolatile memory card.

The functions of the embodiment are realized when the computer executes the readout program codes. Also, the functions of the embodiment are realized when an OS or the like running on the computer performs part or all of actual processing on the basis of the instructions of the program codes.

The functions of the embodiment are also realized when the program codes read out from the storage medium are written in the memory of a function expansion board inserted into the computer or the memory of a function expansion unit connected to the computer, and the CPU of the function expansion board or function expansion unit performs part or all of actual processing on the basis of the instructions of the program codes.

Figure 3:
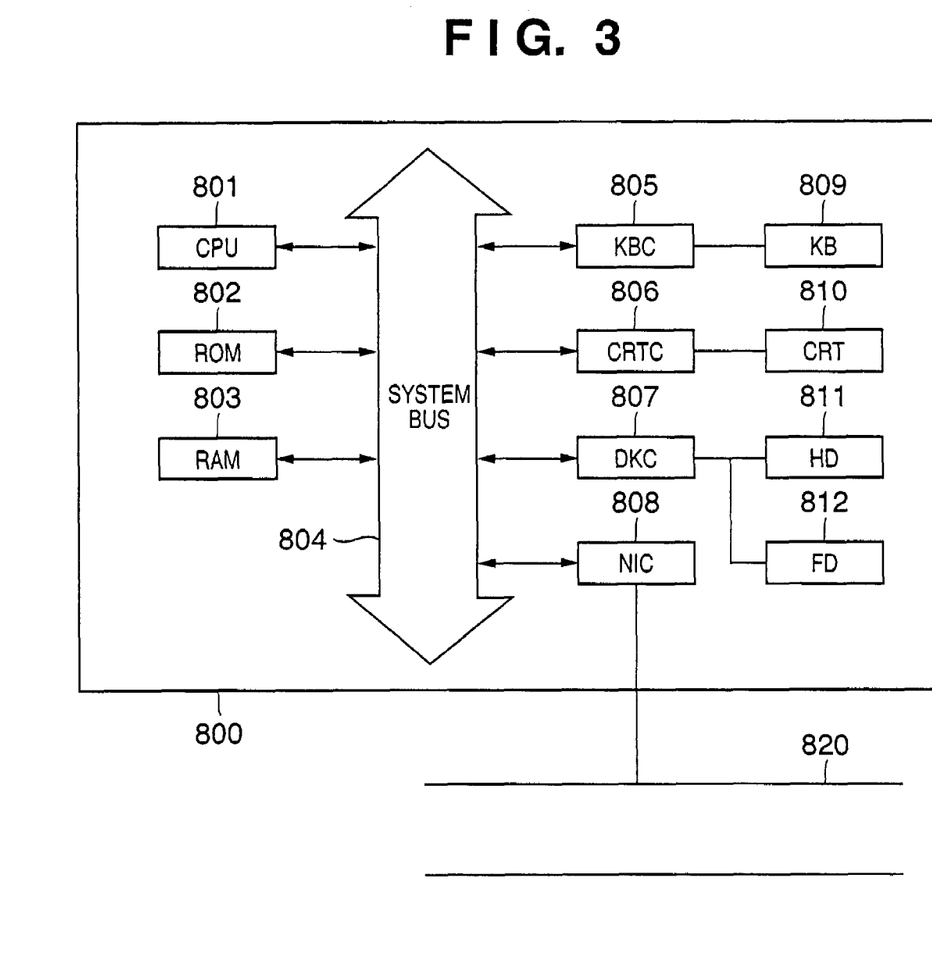
FIG. 3 is a block diagram showing the arrangement of a computer which reads out from a computer-readable storage medium a program for causing the computer to realize the functions of the image processing system, and executes the program.

FIG. 3 shows a computer function 800.

In the computer function 800, as shown in FIG. 3, a CPU 801, a ROM 802, a RAM 803, a keyboard controller (KBC) 805 of a keyboard (KB) 809, a CRT controller (CRTC) 806 of a CRT display (CRT) 810 serving as a display, a disk controller (DKC) 807 for a hard disk (HD) 811 and flexible disk (FD) 812, and a network interface controller (NIC) 808 for connection to a network 820 are communicably connected to each other via a system bus 804.

The CPU 801 comprehensively controls the respective devices connected to the system bus 804 by executing software stored in the ROM 802 or HD 811, or executing software supplied from the FD 812.

More specifically, the CPU 801 reads out a processing program complying with a predetermined processing sequence, executes the program, and performs control for realizing the operation of the embodiment.

The RAM 803 functions as a main memory, work area, or the like for the CPU 801.

The KBC 805 controls an instruction input from the KB 809, a pointing device (not shown), or the like.

The CRTC 806 controls the display of the CRT 810.

The DKC 807 controls access to the HD 811 and FD 812 which store a boot program, various applications, an editing file, a user file, a network management program, a predetermined processing program in the embodiment, and the like.

The NIC 808 bidirectionally exchanges data with an apparatus or system in the network 820.

As has been described above, this embodiment performs white balance control to a pickup image on the basis of arbitrary control information selected from a plurality of pieces of control information (control values) which are added to the pickup image (e.g., an image picked up by an image pickup element having a plurality of color filters) and used for white balance control of the pickup image.

More specifically, when a pickup image is to be stored in a memory removable from an apparatus or system, a plurality of control values used for white balance control of the pickup image are added to the pickup image and stored. On a side where the pickup image is reproduced (developed, reproduced, and the like) from the memory, a control value for controlling the white balance of the pickup image need not be generated. The white balance of the pickup image can be controlled using the control values added to the pickup image. An arbitrary control value is selected (by a user instruction or the like) from a plurality of control values added to the pickup image, and desired white balance control can be executed using the selected control value.

On the pickup image reproducing side, a control value for desired white balance control can be freely selected regardless of white balance control on the pickup image storing side. A white balance control result based on the selected control value can be obtained. The pickup image reproducing side need not adopt any arrangement of obtaining a control value for white balance control, thus reducing the calculation burden on the reproducing side.

For example, when a terminal apparatus such as a personal computer is used on the pickup image reproducing side and white balance control is realized by software, the burden of calculation processing for white balance control is more greatly reduced.

Accordingly, this embodiment can always efficiently, properly perform white balance control to a pickup image, and provide a high-quality pickup image.

The present invention is not limited to the above embodiment and various changes and modifications can be made within the spirit and scope of the present invention. Therefore, to apprise the public of the scope of the present invention the following claims are made.

What is claimed is:

1. An image pickup apparatus comprising:
   an image pickup unit;
   a white balance calculation unit adapted to calculate a first white balance control value on the basis of the image data of one frame output from said image pickup unit;
   a memory adapted to store a second white balance control value corresponding to a light source which has a specific color temperature calculated on the basis of image data picked up by a different image pickup unit of another image pickup apparatus; and
   a control unit adapted to record the image data picked up by said image pickup unit together with both the first and second white balance control value as additional information of the image data automatically so as to be selectively applicable to control the white balance of the image data to a recording medium which is capable of being detached from said image pickup apparatus.

2. The apparatus according to claim 1, further comprising an adjustment calculation unit which calculates the second white balance control value in which a difference of characteristics between image pickup apparatuses are corrected, based on the image data which are picked up by a reference image pickup apparatus as said another image pickup apparatus and the image data which are picked up by said image pickup apparatus.

3. The apparatus according to claim 2, wherein said control unit records the image data picked up by the reference image pickup apparatus to the recording medium.

4. The apparatus according to claim 1, wherein said memory stores a plurality of second white balance control values corresponding to a plurality of the light sources, each of which has a specific color temperature.

5. An image processing method comprising:
   calculating a first white balance control value and a second white balance control value as information related to image data of one frame picked up by an image pickup unit, which picks up an object image, under a first image pickup condition, the first white balance control value being calculated from the image data of the one frame which picked up by the image pickup unit under the first image pickup condition; and
   calculating a second white balance control value corresponding to a light source which has a specific color temperature on the basis of an image data picked up by a different image pickup unit of another image pickup apparatus; and
   recording the image data picked up by said image pickup unit together with both the first white balance control value and the second white balance control value as additional information of the image data automatically so as to be selectively applicable to control the white balance of the image data.

6. The method according to claim 5, wherein calculating the second white balance control value further comprises calculating a second white balance control value in which a difference of characteristics between image pickup apparatuses are corrected based on the image data which are picked up by a reference image pickup apparatus as said another image pickup apparatus and the image data which are picked up by said image pick up apparatus.

7. The apparatus according to claim 6, wherein the recording includes a recording of the image data picked up by the reference image pickup apparatus.

8. The method according to claim 5, wherein the calculating includes calculating a plurality of second white balance control values corresponding to a plurality of the light sources, each of which has a specific color temperature.

9. An image pickup system comprising:
   an image pickup unit;
   a white balance calculation unit adapted to calculate a first white balance control value on the basis of the image data of one frame output from said image pickup unit, which picks up an object image, under a first image pickup condition;
   a memory adapted to store a second white balance control value corresponding to a light source which has a specific color temperature calculated on the basis of image data picked up by a different image pickup unit of another image pickup apparatus;
   a control unit adapted to record the image data picked up by said image pickup unit together with both the first and second white balance control value as additional information of the image data automatically so as to be selectively applicable to control the white balance of the image data to a recording medium which is capable of being detached from said image pickup apparatus;
   a selection unit adapted to select a white balance correction based on the first white balance control value or a white balance correction based on the second white balance control value; and
   a white balance correction unit adapted to perform the white balance correction, which is selected by said selection unit, to the image data.

10. An image processing method of an image pickup apparatus comprising:

calculating a first white balance control value on the basis of the image data of one frame picked up by an image pickup unit;

calculating a second white balance control value corresponding to a light source which has a specific color temperature on the basis of image data picked up by a different image pickup unit of another image pickup apparatus;

recording the image data picked up by said image pickup unit together with both the first white balance control value and the second white balance control value as additional information of the image data automatically so as to be selectively applicable to control the white balance of the image data;

selecting a white balance correction based on the first white balance control value or a white balance correction based on the second white balance control value; and performing the white balance correction, which is selected by said selection unit, to the image data.

* * * * *